US009874969B2

(12) United States Patent
Joo et al.

(10) Patent No.: US 9,874,969 B2
(45) Date of Patent: Jan. 23, 2018

(54) INPUT DEVICE, VEHICLE INCLUDING THE SAME, AND METHOD FOR CONTROLLING THE SAME

(71) Applicant: HYUNDAI MOTOR COMPANY, Seoul (KR)

(72) Inventors: Sihyun Joo, Seoul (KR); Jeong-Eom Lee, Yongin-Si (KR); Jungsang Min, Seoul (KR); Gi Beom Hong, Bucheon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 86 days.

(21) Appl. No.: 14/937,346

(22) Filed: Nov. 10, 2015

(65) Prior Publication Data
US 2017/0031496 A1    Feb. 2, 2017

(30) Foreign Application Priority Data

Jul. 27, 2015  (KR) .................. 10-2015-0105559

(51) Int. Cl.
| *G06F 3/041*  | (2006.01) |
| *G06F 3/0488* | (2013.01) |
| *B60K 37/06*  | (2006.01) |
| *G06F 3/01*   | (2006.01) |

(52) U.S. Cl.
CPC ............ *G06F 3/0416* (2013.01); *B60K 37/06* (2013.01); *G06F 3/017* (2013.01); *G06F 3/04883* (2013.01); *B60K 2350/1024* (2013.01); *B60K 2350/1052* (2013.01); *G06F 2203/04104* (2013.01)

(58) Field of Classification Search
CPC ....... G06F 3/04883; G06F 3/017; G09G 5/14; G09G 2380/14
See application file for complete search history.

(56) References Cited

U.S. PATENT DOCUMENTS

| 6,198,475 B1 | 3/2001 | Kunimatsu et al. |
| 6,300,939 B1 | 10/2001 | Decker et al. |
| 8,542,206 B2 | 9/2013 | Westerman et al. |
| 8,584,049 B1 * | 11/2013 | Zhai .......................... G06F 3/01 715/702 |

(Continued)

FOREIGN PATENT DOCUMENTS

| JP | 2012-133715 A | 7/2012 |
| KR | 10-0771626 B1 | 10/2007 |

(Continued)

OTHER PUBLICATIONS

Office Action dated Feb. 18, 2016, in related Korean Patent Application No. 10-2015-0105559.

(Continued)

*Primary Examiner* — Gerald Johnson
(74) *Attorney, Agent, or Firm* — McDermott Will & Emery LLP

(57) ABSTRACT

A touch input device includes a display configured to display a character which is inputted by a user. A touch unit has a concave shape and configured to receive a command for deleting the inputted character. A controller is configured to determine a delete unit of the inputted character according to the number of touch gesture input to the touch unit.

20 Claims, 14 Drawing Sheets

(56) References Cited

U.S. PATENT DOCUMENTS

| | | | |
|---|---|---|---|
| 2010/0073563 A1* | 3/2010 | Painter | H04N 5/4403 |
| | | | 348/563 |
| 2011/0050589 A1 | 3/2011 | Yan et al. | |
| 2012/0011462 A1 | 1/2012 | Westerman et al. | |
| 2013/0067411 A1 | 3/2013 | Kataoka et al. | |
| 2015/0094974 A1 | 4/2015 | Backes | |
| 2015/0121285 A1* | 4/2015 | Eleftheriou | G06F 3/04842 |
| | | | 715/773 |
| 2015/0370779 A1* | 12/2015 | Dixon | G06F 3/04883 |
| | | | 715/261 |

FOREIGN PATENT DOCUMENTS

| | | |
|---|---|---|
| KR | 10-1265431 B1 | 5/2013 |
| KR | 10-1328202 B1 | 11/2013 |
| KR | 10-2014-0032763 A | 3/2014 |

OTHER PUBLICATIONS

Search Report issued in European Patent Application No. 16180104.8 dated Dec. 9, 2016.
Notice of Allowance dated Mar. 20, 2017, in corresponding Korean Patent Application No. 10-2015-0105559, with English translation.

* cited by examiner

INPUT DEVICE, VEHICLE INCLUDING THE SAME, AND METHOD FOR CONTROLLING THE SAME

CROSS-REFERENCE TO RELATED APPLICATION(S)

This application claims the benefit of priority to Korean Patent Application No. 10-2015-0105559, filed on Jul. 27, 2015 in the Korean Intellectual Property Office, the disclosure of which is incorporated herein by reference.

TECHNICAL FIELD

The present disclosure relates to a touch input device capable of deleting and correcting character, and a control method of the same.

BACKGROUND

Recently, with the development of electronic equipment, a method of inputting a command signal by using a touch in addition to by using an operation key, and a dial has been used.

A touch input device is an interlace between an information communication device using a variety of display and a user. When the user touches directly or indirectly a touch pad or a touch screen by using a finger or a touch pen, the touch input device allows the interface between the information communication device and the user.

In recent years, the touch input device has been widely used in a vehicle, and thus, a variety of research has been in progress to improve user convenience for operating the touch input device.

SUMMARY

An aspect of the present inventive concept provides a touch input device capable of intuitively deleting and correcting an input character, and a control method for controlling thereof.

Additional aspects of the present inventive concept will be set forth in part in the description which follows and, in part, will be obvious from the description, or may be learned by practice of the present disclosure.

In accordance with one embodiment of the present inventive concept, an input device includes a display configured to display a character which is inputted. A touch unit has a concave shape and is configured to receive a command for deleting the inputted character. A controller is configured to determine a delete unit of the inputted character according to the number of touch gesture input to the touch unit.

The controller may delete a single character when the touch gesture of a single touch is input, and may delete two and more characters or entire characters when the touch gesture of a plurality of touches are input.

The touch gesture may include at least one gesture selected from the group including flicking, rolling, spinning, swiping, and tapping.

The controller may delete the inputter character at a first speed when a touch gesture input speed is less than a second speed, and may delete the inputted character at a third pre-determined speed, which is faster than the first speed, when the touch gesture input speed is faster than the second speed.

The controller may delete the inputted character by a first unit when a touch gesture input time is less than a first time, and may delete the inputted character by a second unit, which is larger than the first unit, when the touch gesture input time is longer than the first time.

The controller may delete the inputted character by a third unit when a touch gesture input diameter is less than a first diameter, and may delete the inputted character by a fourth unit, which is larger than the third unit, when the touch gesture input diameter is larger than the first diameter.

The controller may delete the inputted character to be deleted by a fifth unit when the number of touch gesture input is less than a first number of time, and may delete the inputted character by a sixth unit, which is larger than the fifth unit, when the number of touch gesture input is more than the first number of time.

The display and the touch unit may be formed separately.

In accordance with another embodiment of the present inventive concept, a vehicle includes a display configured to display a character which is inputted by a user. A touch unit has a concave shape and is configured to receive a command for deleting the inputted character. A controller is configured to control a delete unit of the inputted character, which is deleted according to the number of touch gesture input to the touch unit.

The controller may delete a single character when the touch gesture of a single touch is input, and may delete two and more characters or entire characters when the touch gesture of a plurality of touches are input.

The touch gesture may include at least one gesture selected from the group including flicking, rolling, spinning, swiping, and tapping.

The controller may delete the inputted character at a first speed when a touch gesture input speed is less than a second speed, and may delete the inputted character at a third speed, which is faster than the first speed, when the touch gesture input speed is faster than the second speed.

The controller may delete the inputted character by a first unit when a touch gesture input time is less than a first time, and may delete the inputted character by a second unit, which is larger than the first unit, when the touch input time is longer than the first time.

The controller may delete the inputted character by a third unit when a touch gesture input diameter is less than a first diameter, and may delete the inputted character by a fourth unit, which is larger than the third unit, when the touch gesture input diameter is larger than the first diameter.

The controller may delete the inputted character by a fifth unit when the number of touch gesture input is less than a first number of time, and may delete the inputted character by a sixth unit, which is larger than the fifth unit, when the number of touch gesture input is more than the first number of time.

The display and the touch unit may be formed separately.

In accordance with another embodiment of the present inventive concept, a control method of an input device including a touch unit which has a concave shape includes receiving a touch command via the touch unit. A delete unit of character, which is being input, is determined according to the number of touch gesture input to the touch unit.

The step of determining may include determining a single character to be deleted when the touch gesture of a single touch is input, and determining two and more characters or entire characters to be deleted when the touch gesture of a plurality of touches are input.

The touch gesture may include at least one gesture selected from the group including flicking, rolling, spinning, swiping, and tapping.

The control method may further include deleting the inputted character at a first speed when a touch gesture input speed is less than a second speed, and deleting the inputted character at a third speed, which is faster than the first speed, when the touch gesture input speed is faster than the second speed.

The control method may further include deleting the inputted character by a first unit when a touch gesture input time is less than a first pre time, and deleting the inputted character by a second unit, which is larger than the first unit, when the touch gesture input time is longer than the first time.

The control method may further include deleting the inputted character by a third unit when a touch gesture input diameter is less than a first diameter, and deleting the inputted character by a fourth unit, which is larger than the third unit, when the touch gesture input diameter is larger than the first diameter.

The control method may further include deleting the inputted character by a fifth unit when the number of touch gesture input is less than a first number of time, and deleting the inputted character by a sixth unit, which is larger than the fifth unit, when the number of touch gesture input is more than the first number of time.

BRIEF DESCRIPTION OF THE DRAWINGS

These and/or other aspects of the disclosure will become apparent and more readily appreciated from the following description of embodiments, taken in conjunction with the accompanying drawings.

DETAILED DESCRIPTION

Reference will now be made in detail to embodiments of the present inventive concept, examples of which are illustrated in the accompanying drawings.

Figure 1:
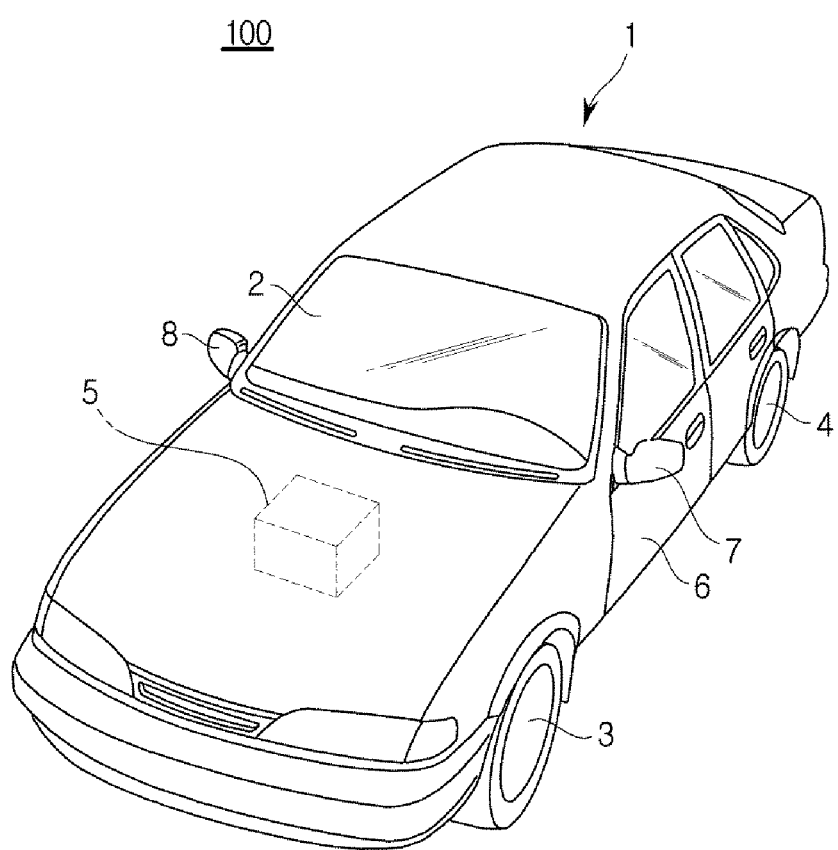
FIG. 1 is a view of an exterior of a vehicle in accordance with one embodiment of the present inventive concept.

FIG. 1 is a view of an exterior of a vehicle in accordance with one embodiment of the present inventive concept.

Referring to FIG. 1, a vehicle 100 may include a body 1 forming an exterior of the vehicle 100, a front glass 2 providing a front view of the vehicle 100 to a driver inside the vehicle 100, vehicle wheels 3 and 4 moving the vehicle 100, a driving device 5 rotating the vehicle wheels 3 and 4, a door 6 closing the inside of the vehicle 100 from the outside, and side mirrors 7 and 8 providing a view of a rear side of the vehicle 100 to the driver.

The front glass 2 may be provided on an upper portion of the front of the vehicle 100 to allow a driver inside the vehicle 100 to acquire visual information about the front of the vehicle 100 and may be referred to as "windshield glass."

The vehicle wheels 3 and 4 may include a front wheel 3 provided on a front of the vehicle 100 and a rear wheel 4 provided on a rear of the vehicle 100. The driving device 5 may supply a torque to the front wheel 3 and the rear wheel so that the vehicle 100 may move forward and backward. The driving device 5 may employ an engine which generates a torque by burning fossil fuel or a motor which generates a torque by receiving power source from a capacitor (not shown).

The door 6 may be rotatably provided on a right side and a left side of the body 1. When the door 6 is opened, a driver may seat in the vehicle 100. When the door 6 is closed, the inside of the vehicle 100 may be closed from the outside. A window may be installed in the door 6 so that a user may see the outside or other may see the inside of the vehicle 100 from the outside. According to the embodiment, the window may be installed to see from only one side to be openable/closable.

The side mirrors 7 and 8 may include a left side mirror 7 provided on the left side of the body 1 and a right side mirror 8 provided on the right side of the body 1. The side mirrors 7 and 8 may allow a driver inside the vehicle 100 to acquire visual information of the lateral side and the rear side of the vehicle 100.

Figure 2:
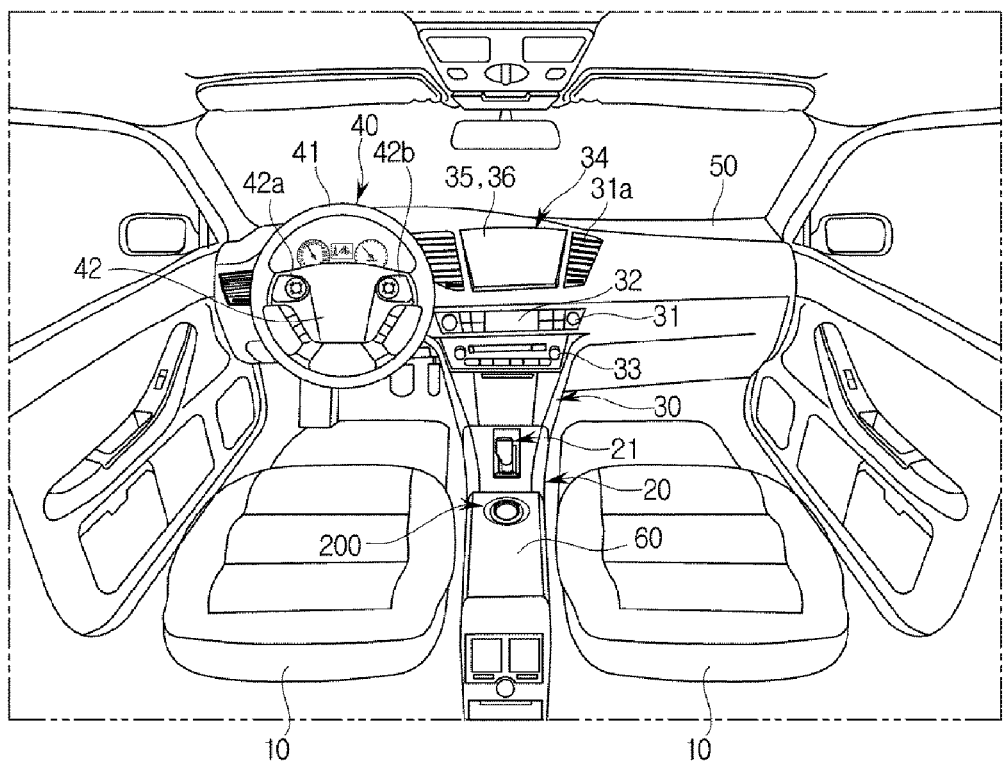
FIG. 2 is a view of an interior of a vehicle in accordance with one embodiment of the present inventive concept.

FIG. 2 is a view illustrating an inner structure of a vehicle in accordance with one embodiment of the present inventive concept.

Referring to FIG. 2, the vehicle 100 may include a seat 10 in which a driver or a passenger is seated, a dashboard 50 in which a gear box 20, a center fascia 30, and a steering wheel 40 are provided, and an armrest 60.

The gear box 20 includes a gear lever 21 changing a speed of the vehicle 100 and an input device 200 controlling an operation of functions of the vehicle 100. The input device 200 may include a touch input device 200 configured to perform a touch input method. Hereinafter for convenience of description, an example in which the input device 200 is provided as the touch input device. The touch input device 200 may play a role as a center controller, may control a variety of functions of the vehicle 100, and may receive an input of a command of inputting, deleting, or correcting of character from a user.

An air conditioning device 31, a clock 32, an audio device 33 and an audio video navigation (AVN) device 34 may be installed in the center fascia 30.

The air conditioning device 31 may maintain an air inside the vehicle 100 in fresh by controlling a temperature, a moisture, an air cleanliness, and a flow of air of the inside of the vehicle 100. The air conditioning device 31 may be installed in the center fascia 30 and may include at least one discharging port 31a discharging air. A button or a dial may be installed in the center fascia 30 to control the air conditioning device 31. The user, such as a driver, may control the air conditioning device 31 by using a button disposed on the center fascia 30.

The clock 32 may be provided adjacent to a button or a dial which controls the air conditioning device 31.

The audio device 33 may include an operation panel in which a number of buttons are provided to perform functions of the audio device 33. The audio device 33 may provide a radio mode for a radio function, and a media mode for an audio file of various storage media in which the audio file is stored.

The AVN device 34 may be embedded inside the center fascia 30 of the vehicle 100. The AVN device 34 may be a device configured to integrally operate an audio function, a video function, and a navigation function according to an operation by a user. The AVN device 34 may include an input unit 35 configured to receive an input of a command about the AVN device 34 from a user, and a display unit 36 configured to display a screen related to an audio function, a screen related to a video function, and a screen related to a navigation function.

The steering wheel 40 may adjust a driving direction of the vehicle 100, and may include a rim 41 and a spoke 42 which is connected to a steering system of the vehicle 100 and connect the rim 41 to a hub of a rotation shaft for the steering. According to the embodiment, manipulation devices 42a and 42b may be formed in the spoke 42 to control various devices inside the vehicle 100, such as an audio device.

According to the embodiment, the dashboard 50 may further include various gauge boards indicating a driving speed of the vehicle 100, and the number of engine rotation or fuel residual quantity, and a globe box in which various things are stored.

The armrest 60 may allow a driver to rest his/her arm, and may be a part to which a driver or a passenger rests his/her arm to take a comfortable position in the vehicle 100. Around the armrest 60, a near range sensor, which detects whether a user's arm is placed, may be installed.

Figure 3:
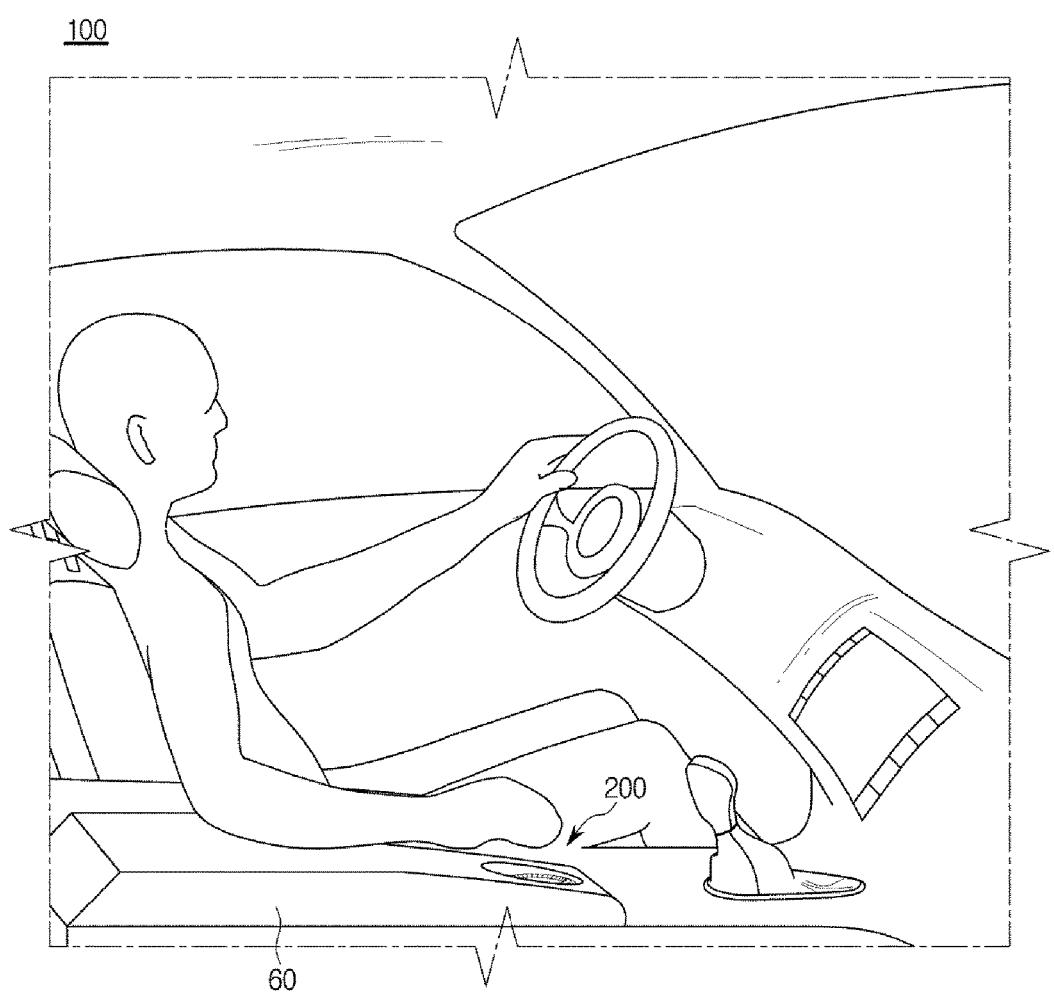
FIG. 3 is a view illustrating that a user operates a touch input device in accordance with one embodiment of the present inventive concept.

Hereinafter the touch input device 200 according to one embodiment will be described in detail. FIG. 3 is a view illustrating that a user operates a touch input device 200 in accordance with the present disclosure, and FIG. 4 is an enlarged view of a touch input device 200 in accordance with the present disclosure.

Referring to FIG. 3, a user may operate the touch input device 200 while putting his/her arm on the armrest 60. The armrest 60 may be a part to which a driver or a passenger rests his/her arm to take a comfortable position in the vehicle 100, and may be formed in an ergonomic manner.

Figure 4:
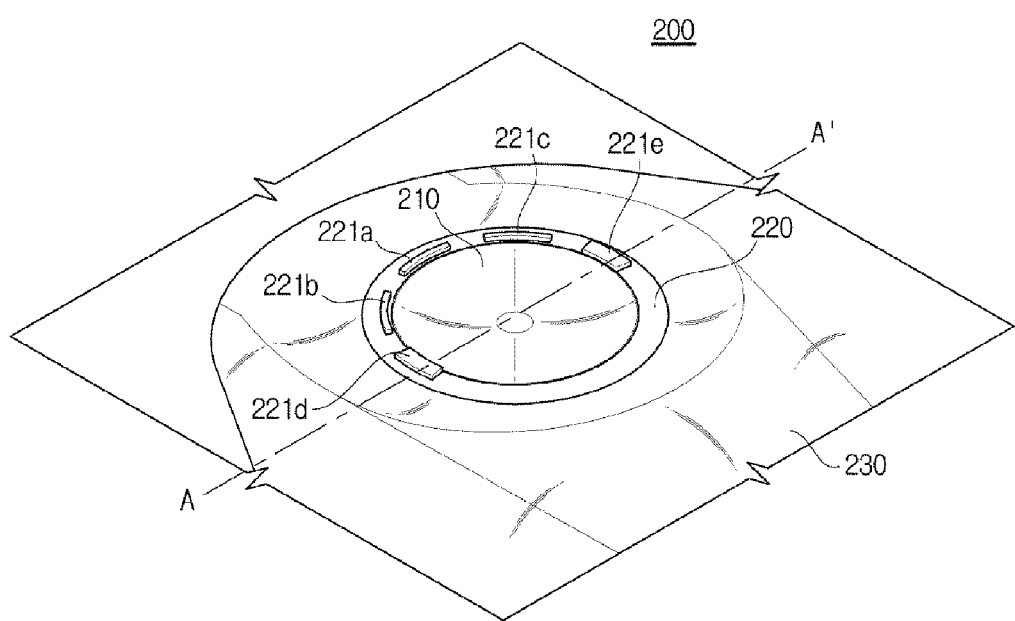
FIG. 4 is an enlarged view of a touch input device in accordance with one embodiment of the present inventive concept.

Referring to FIG. 4, the touch input device 200 may include a touch unit 210 configured to receive an input of a gesture from a user, and an edge unit 220 surrounding the touch unit 210.

The touch unit 210 may be a touch pad in which a signal is inputted when a user touches or closes by using a pointer, such as a finger or a touch pen. The user may input a desired instruction or a command by inputting a touch gesture to the touch unit 210.

The touch unit 210 may be implemented by "proximity touch" method or "contact touch" method. Recognizing a position of the pointer in a state in which the pointer is adjacent to the touch pad without touching the touch pad may be referred to as "proximity touch," and recognizing a position of the pointer in a state in which the pointer is touched on the touch pad may be referred to as "contract touch." A position where proximity touch occurs may be a position vertically corresponding to the pointer with respect to the touch pad when the pointer is close to the touch pad.

Regardless of the name of touch pad, the touch pad may include a touch film, or a touch sheet including a touch sensor. The touch pad may be implemented by using resistive technology, optical technology, capacitive technology, ultrasound technology and pressure technology, but is not limited thereto. A well-known technology may be used for the touch pad.

The edge unit 220 may represent a portion surrounding the touch unit 210, and may be provided by a member, which is separated from the touch unit 210. In the edge unit 220, key buttons or touch buttons 221a, 221b, 221c, 221d, 221e surrounding the touch unit 210 may be provided. That is, a user may input a gesture to the touch unit 210, and may input a signal by using the buttons 221a, 221b, 221c, 221d, 221e provided in the edge unit 220 in the surround of the touch unit 210.

The touch input device 200 according to one embodiment may further include a wrist supporting member 230 disposed to be a lower portion of the gesture input tool to support a user's wrist. At this time, the wrist supporting member 230 may be disposed to be higher than the touch unit 210 that is a gesture input tool. The wrist may be prevented from being bent when the user touches the touch unit 210 in a state of supporting the wrist supporting member 230. Accordingly, while preventing user's muscloskeletal disease, more comfortable sense of operation may be provided.

Figure 5:
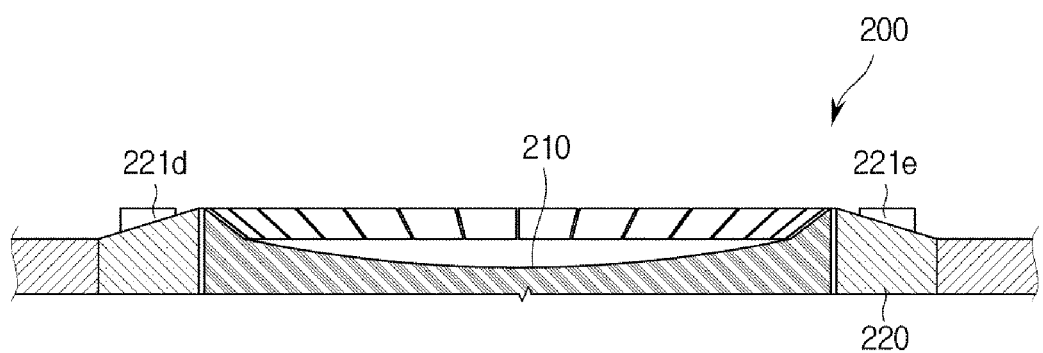
FIG. 5 is a cross-sectional view taken along the line A-A' of a touch input device of FIG. 4.

FIG. 5 is a cross-sectional view taken along the A-A' of a touch input device 200 of FIG. 4.

Referring to FIG. 5, the touch unit 210 may include a lower portion than the boundary of the edge unit 220. That is, a touch area of the touch unit 210 may be provided to be lower than the boundary line between the touch unit 210, and the edge unit 220. For example, the touch area may be provided to be inclined downward from the boundary line of the edge unit 220 or to have a step from the boundary line of the edge unit 220.

According to the embodiment, the touch unit 210 may be formed in a concave shape. The concave shape may represent a dent or a recessed shape, and may include a dent shape to be inclined or to have a step as well as a dent shape to be circle. According to embodiments, the touch unit 210 may be formed in a way that a curvature of the center portion is small and a curvature of the edge portion is large.

Figure 6:
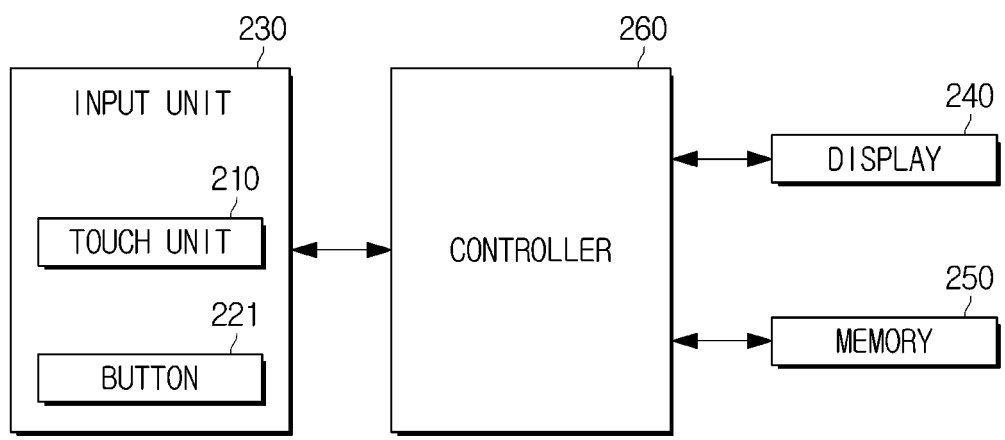
FIG. 6 is a control diagram of a touch input device in accordance with one embodiment of the present inventive concept.

FIG. 6 is a control diagram of a touch input device in accordance with one embodiment of the present inventive concept.

Referring to FIG. 6, the vehicle 100 may include an input unit 230, a display 240, a memory 250, and a controller 260. Hereinafter a description of the vehicle 100 may include a description of the touch input device 200 according to one embodiment, and a duplicated description will be omitted.

The input unit 230 may receive an input of control signal related to functions of the vehicle 100 from a user, and may transmit the input control signal to the controller 260. The input unit 230 may be a concept of an input unit 35 of the AVN device 34, and may be implemented by a pressure button or a touch pad. According to the embodiment, the input unit 230 may be a concept including the touch unit 210 of the touch input device 200, and the buttons 221a, 221b, 221c, 221d, 221e provided in the edge unit 220, but is not limited thereto. Hereinafter the input unit 230 will be described in detail with reference to a case in which the input unit 230 includes the touch unit 210 and the buttons 221a, 221b, 221c, 221d, 221e.

Figure 7:
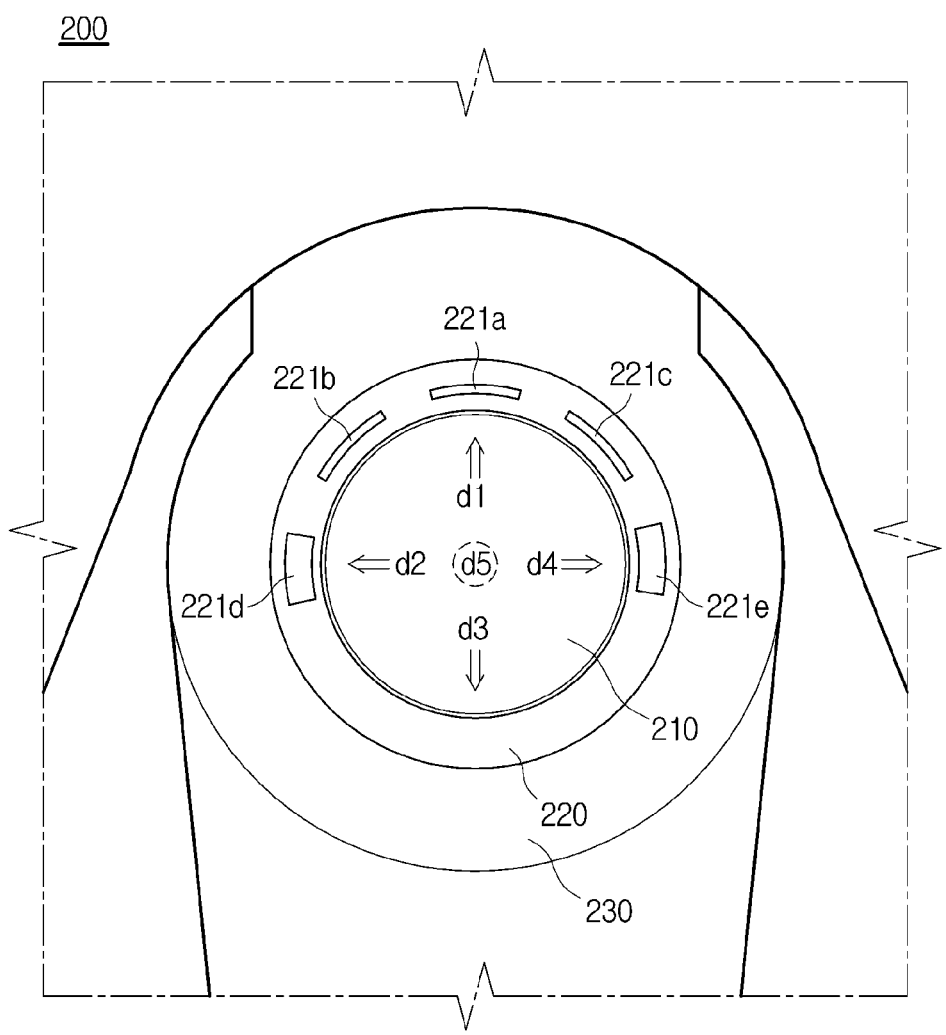
FIG. 7 is a plane view illustrating an operation of a touch input device in accordance with one embodiment of the present inventive concept.

FIG. 7 is a plane view illustrating an operation of a touch input device in accordance with one embodiment of the present inventive concept.

The touch unit 210 may be provided to allow pressing gesture or tilting gesture. The pressing gesture may include a case in which the touch unit 210 is pressed in a flat manner and a case in which the touch unit 210 is pressed in a tilted manner. In addition, when the touch unit 210 is provided to be flexible, only a part of the touch unit 210 may be pressed.

The touch unit 210 may be tilted in at least one direction (d1 to d4) with respect to a central axis of the touch unit 210. As illustrated in FIG. 7, the touch unit 210 may be tilted in four directions of up, down, left and right (d1 to d4), but is not limited thereto. The touch unit 210 may be provided to be tilted in various directions according to the embodiment. In addition, when a user presses a central portion d5 of the touch unit 210, the touch unit 210 may be pressed in a flat manner.

A user may input a command to operate functions of the vehicle 100 by pressing or tilting a part of the touch input device 200 with pressure. For example, the user may select a menu by pressing the central portion d5 of the touch unit 210, and may move a cursor upward by pressing an upper side d1 of the touch unit 210.

The touch unit 210 may receive an input of touch gesture including a command for inputting, correcting or deleting a character, number, symbol from a user. Herein, the character may be a wide concept including Alphabet, etc. The user may directly input a character, intended to be input, to the touch unit 210, and may delete or correct a character, which is being input, by using a flicking gesture, a rolling gesture, a spin gesture, a swiping gesture, or a tap gesture. The touch input device 200 according to one embodiment may provide an intuitive character input method to a user by using the above mentioned method.

Particularly, the flicking may represent a touch input method performed in a way that the finger moves in one direction while being contacted to the touch unit 210, and then the contact state is released, the rolling may represent a touch input method of drawing an arc with respect to the center of the touch unit 210, the spinning may represent a touch input method of drawing a circle with respect to the center of the touch unit 210, the swiping may represent a touch input method of swiping the touch unit 210 in the left side and the right side, and the tapping may represent a touch input method of tapping the center of the touch unit 210. The gesture for deleting character is not limited thereto, and may include a variety of gestures including "X" gesture.

The touch unit 210 may receive an input of multi-touch gesture from a user. The multi-pointer input technology may represent a method of inputting a gesture in a state in which two pointers are contacted simultaneously or sequentially. For example, a gesture may be input while two fingers are contacted to the touch unit 210, and according to embodiments, a gesture may be input while three or four fingers are contacted. By using the multi-pointer input technology, the touch unit 210 may provide a variety of input method to a user.

On the edge portion of the touch unit 210, a plurality of buttons 221a, 221b, 221c, 221d, 221e may be provided. The user may quickly input a command for operating functions of the vehicle 100 by operating 221a, 221b, 221c, 221d, 221e without changing a position of the hand while inputting a gesture.

FIG. 7 illustrates that five buttons 221a, 221b, 221c, 221d, 221e are provided, but the number of buttons is not limited thereto. Hereinafter for convenience of description, a case in which five buttons 221a, 221b, 221c, 221d, 221e are provided around the touch unit 210 will be described as an example. According to one embodiment, each buttons 221a, 221b, 221c, 221d, 221e may include a home button 221a moving to a home menu, a back button 221d moving from a present screen to a previous screen, an option button 221e moving to an option menu and two shortcut buttons 221b and 221c. By designating a menu or a device, which is often used by a user, the shortcut buttons 221b and 221c may directly move to the menu or the device. The function of each button 221a, 221b, 221c, 221d, 221e is not limited thereto, and each button 221a, 221b, 221c, 221d, 221e may provide another function according to a user's selection.

The display 240 may display an operation screen configured to operate the vehicle 100 according to a command from a user, which is input via the input unit 230. The display 240 may include a display unit 36 of the AVN device 34, may employ light emitting diode (LED) or liquid crystal display (LCD), but is not limited thereto.

The operation screen displayed on the display 240 may include a character input screen configured to display a character, which is being input from a user.

Figure 8:
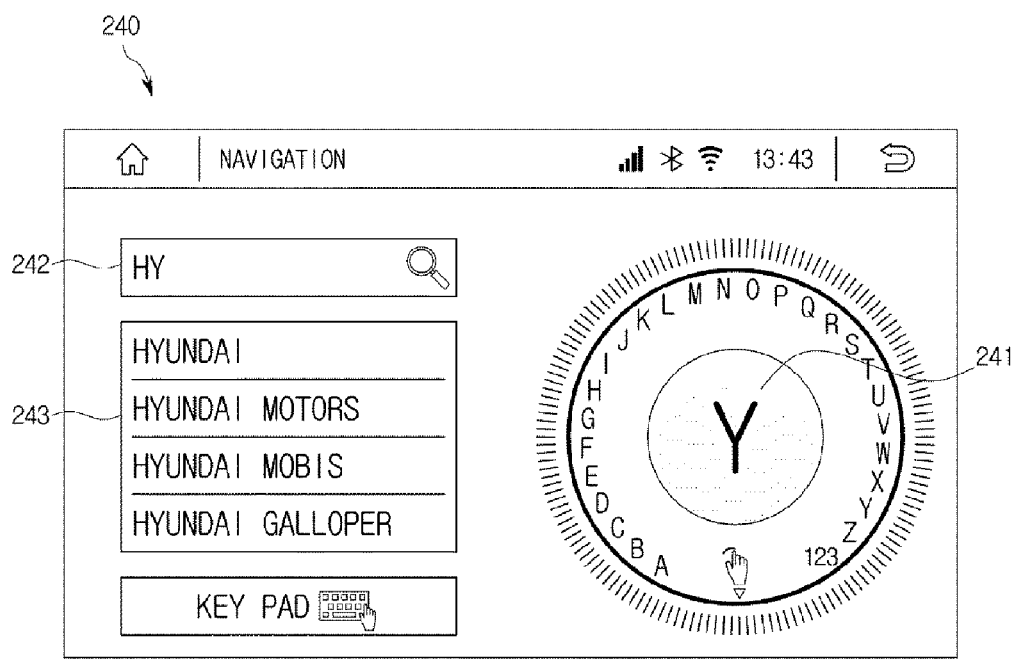
FIG. 8 is a view illustrating of an example of a character input screen in accordance with one embodiment of the present inventive concept.

FIG. 8 is a view illustrating of an example of a character input screen in accordance with one embodiment of the present inventive concept.

Referring to FIG. 8, the character input screen may include a character display area 241 displaying a character being input from a user, a word display area 242 displaying a word being input from a user, and a candidate display area 243 displaying candidates of words being input from a user. The character display area 241 may be provided on a right side of the character display screen, and may have a circular shape similar to a shape of the touch input device 200. The word display area 242 and the candidate display area 243 may be provided on the left side of the character input screen. Particularly, the word display area 242 and the candidate display area 243 may be disposed on an upper end and a lower end of the left side of the character input screen, side by side vertically. FIG. 8 illustrates an example of the character input screen, but is not limited thereto.

The memory 250 may store a variety of data, program, or applications for operating and controlling the vehicle 100. Particularly, the memory 250 may store control program for controlling the vehicle 100, a dedicated application, which is initially provided from a manufacturer, or a universal application, which is downloaded from outside.

The memory 250 may store gesture information, which is information related to an operation command corresponding to the above mentioned flicking, rolling, spin, swiping, or tap gesture. In addition, the memory 250 may store information related the operation command determined by an operation speed, a period of time, the number of input time, and a touch point of each gesture.

For example, the memory 250 may store information, which is related to a command to delete an input character according to a flicking or swiping gesture input from a user, and may store information, which is related to a command to delete an input character according to other gesture other than the flicking or swiping gesture.

In addition, the memory 250 may store information related to the number of deleted character based on the number of touch point. For example, the memory 250 may store information, which is related to a command of deleting a single character when one point touch gesture is input, and may store information, which is a related to a command of deleting two characters when two point gesture is input. According to embodiments, the memory 250 may store information, which is related to a command of deleting the entire word, which is being input, when four and more point gesture is input.

The memory 250 may store information related to a delete speed of character according to an input speed of touch gesture. For example, the memory 250 may store information, which is related to a command of deleting the character at a first speed when a touch gesture input speed is less than a second speed. The memory 250 may store information related to a command of deleting the character at a third speed, which is faster than the first speed, when the touch gesture input speed is faster than the second speed.

The memory 250 may store information relate to a character unit, which is deleted according to an input time of touch gesture. For example, the memory 250 may store information, which is related to a command of deleting the character by a first unit when a touch gesture input time is less than a first time. The memory 250 may further store information, which is related to a command of deleting the character by a second unit, which is larger than the first unit, when the touch gesture input time is longer than the first time. Hereinafter the character unit may represent the number of deleted character.

The memory 250 may store information relate to a character unit, which is deleted according to a touch gesture size. For example, the memory 250 may store information, which is related to a command of deleting the character by a third unit when a touch gesture input diameter is less than a first diameter, and may store information, which is related to a command of deleting the character by a fourth unit, which is larger than the third unit, when the touch gesture input diameter is larger than the first diameter.

The memory 250 may store information relate to a character unit, which is deleted according to the number of input time of touch gesture. For example, the memory 250 may store information, which is related to a command of deleting a character by a fifth unit when the number of touch gesture input is less than a first number of time, and may store information, which is related to a command of deleting the character by a sixth unit, which is more than the fifth unit, when the number of time touch gesture input is larger than the first number of time.

The memory 250 may include at least one medium of flash memory, hard disc, read-only memory (ROM), random access memory (RAM), electrically erasable programmable read-only memory (EEPROM), programmable read-only memory (PROM), magnetic memory, magnetic disc, and optical disc.

The controller 260 may control operation of the vehicle 100, and a signal flow between internal components of the vehicle 100, and may process data. The controller 260 may operate operation system (OS) and a variety of applications, when an input of a user or a pre-determined condition is satisfied.

The controller 260 may recognize a user's gesture input to the touch unit 210, and may give a command to various devices of the vehicle 100 by analyzing user's gesture. Particularly, the controller 260 may manipulate a cursor displayed on the display unit 240 according to a movement of user's touch gesture, which is input to the touch unit 210. That is, when the user's gesture moves up and down, a cursor displayed on the display unit 240 may be moved in the same direction or a pre-selected menu may be moved to a sub menu from a top menu.

The controller 260 may determine a deleted character unit when the character is being input according to the number of simultaneous touch of touch gesture, which is input to the touch unit 210. The deleted character unit may represent the number of characters, and a single unit may represent a single character. The user's gesture may include at least one gesture for deleting character, which is selected from the group including the above mentioned flicking, rolling, spinning, swiping, or tapping, but is not limited thereto.

Particularly, the controller 260 may control a single character to be deleted when a touch gesture including a single touch is input, and may control two and more characters to be deleted or the entire characters to be deleted when a touch gesture including a pre-determined plurality of simultaneous touches are input.

The controller 260 may control a speed of deleted character according to an input speed of touch gesture. The controller 260 may deleted the inputted character at the first speed when a touch gesture input speed is less than the second speed. The controller 260 may delete the inputted character at a third speed, which is faster than the first speed, when the touch gesture input speed is faster than the second speed. According to embodiments, the controller 260 may delete the inputted character with a certain acceleration when the touch gesture input is faster than the second speed.

The controller 260 may control a deleted character unit according to an input time of touch gesture. For example, the controller 260 may delete the character by a first unit when a touch gesture input time is less than the first time, and may delete the character by a second unit, which is larger than the first unit, when the touch gesture input time is longer than the first time. The second unit may include deleting the entire characters, which is being input.

The controller 260 may control a deleted character unit according to a touch gesture size. For example, the controller 260 may delete the character by the third unit when a touch gesture input diameter is less than a diameter, and may delete the character by the fourth unit, which is larger than the third unit, when the touch gesture input diameter is larger than the first diameter. The fourth unit may include deleting the entire characters which are being input.

The controller 260 may control a deleted character unit according to the number of input time of touch gesture. For example, the controller 260 may control the character to be deleted by the fifth unit when the number of touch gesture input is less than a first number of time, and may control the character to be deleted by the sixth unit, which is larger than the fifth unit, when the number of touch gesture input is more than the first number of time. The sixth unit may include deleting the entire characters.

Hereinafter an operating method of the touch input device in accordance with one embodiment of the present disclosure will be described in detail.

FIGS. 9 to 12 are views illustrating an example of flicking operation of touch input device 200, and an example of an operation screen displayed on the display 240.

Figure 9:
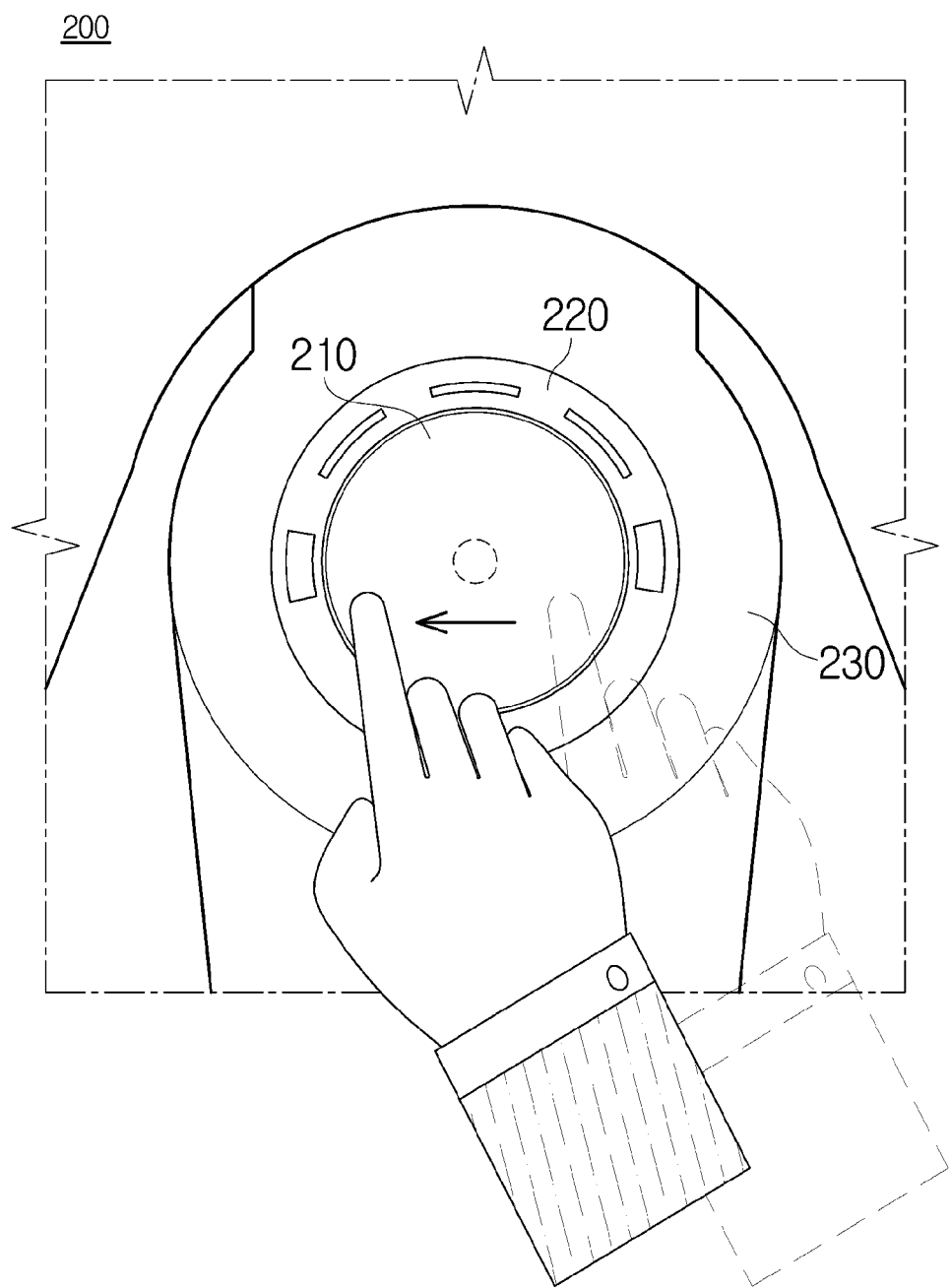
FIGS. 9 to 12 are views illustrating an example of flicking operation of touch input device, and an example of an operation screen displayed on a display.

Referring to FIG. 9, a user may delete a character being input by inputting a flicking gesture in a first direction in the touch unit 210 by using a single finger. Herein, the first direction may represent a direction of the right side to the left side, but is not limited thereto. However, in general, a character may be input from the left side to the right side. Thus, when the first direction is a direction of the right side to the left side, the user may more intuitively input a command of deleting a character compared with when inputting a character.

A user may adjust a method of deleting a character by adjusting the number of simultaneous touch, input speed, input time, size, or the number of time of a flicking gesture input to the touch unit 210. Particularly, as illustrated in FIG.

Figure 10:
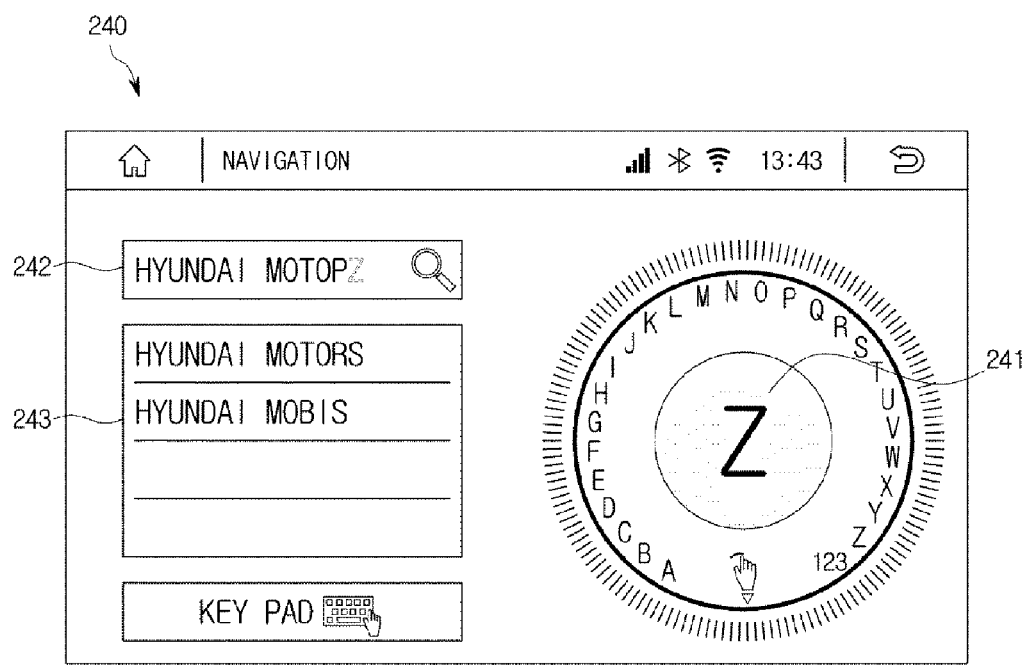

9, when the user inputs a flicking gesture by using a single finger, a single character may be deleted. Referring to FIG. 10, when the user inputs a word, e.g., "HYUNDAI MOTEPZ" to a word display area of the display unit 240, the user may input a command of deleting "Z" by inputting a flicking gesture by using a single finger.

According to the embodiment, when inputting the flicking gesture by using a single finger repeatedly, a command of deleting "Z" and a command of deleting "P" may be input in order, and when inputting the flicking gesture by a single finger at a speed faster than the previous speed, a character may be deleted in a direction of from "Z" to "P" with certain acceleration.

According to the embodiment, when continuously inputting the flicking gesture at least twice, the entire characters being input may be deleted. For example, when the user continuously inputs the flicking gesture with more than three seconds, "MOTOPZ" may be deleted or "HYUNDAI MOTOPZ" may be deleted. When determining a unit of deleted character being input, whether word spacing unit is included or not may be pre-determined or may be temporarily determined by a user.

According to the embodiment, when inputting the flicking gesture with a diameter, which is less than the first diameter, a character among characters, which are being input may be deleted by a pre-determined unit, and when inputting the flicking gesture with a diameter, which is larger than the first diameter, the entire characters, which are being input, may be deleted. For example, when the user inputs the flicking gesture with a diameter, which is less than 3 cm, a command of deleting a unit of character, that is "Z" in "HYUNDAI MOTOPZ" may be input, and when a user inputs the flicking gesture with a diameter, which is larger than 3 cm, "MOTOPZ" may be deleted or "HYUNDAI MOTOPZ" may be deleted. When determining the unit of deleted character being input, whether word spacing unit is included or not may be pre-determined or may be temporarily determined by the user.

The user may adjust the number of deleted characters by using a plurality of fingers.

Figure 11:
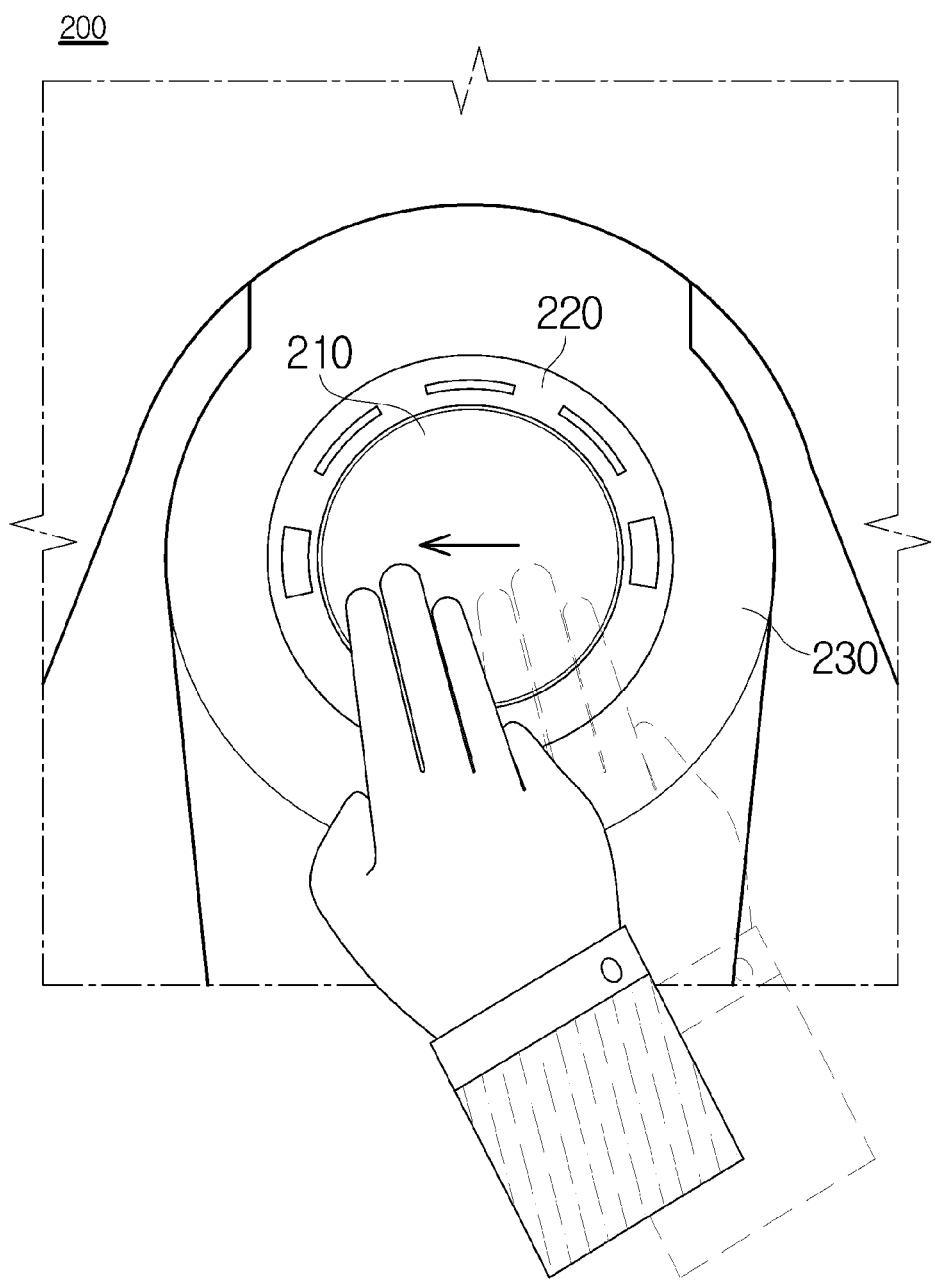
Figure 12:
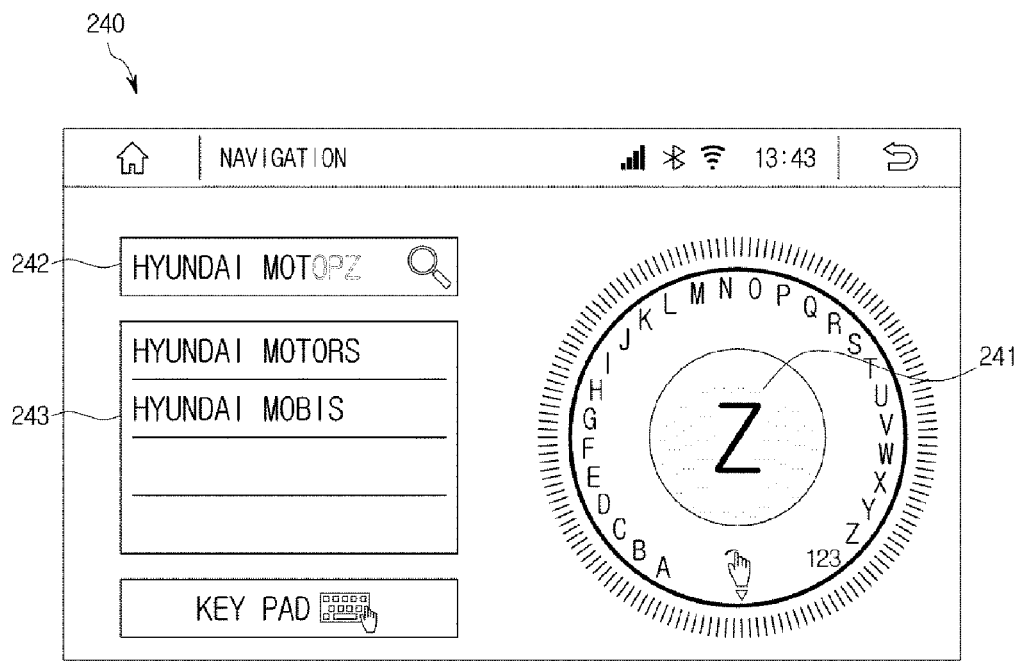

As illustrated in FIG. 11, when the user inputs a flicking gesture by using three fingers, three characters may be deleted. Referring to FIG. 12, when the user inputs a word, e.g., "HYUNDAI MOTOPZ" to the word display area of the display unit 240, the user may input a command of deleting "P," "Z," and "O" by inputting a flicking gesture by using three fingers. According to the embodiments, when the user inputs a flicking gesture by using a single finger repeatedly, a command of deleting "T" and "O" may be input. When a user inputs a flicking gesture by using a single finger, as illustrated in FIG. 9 after inputting a flicking gesture by using three fingers, as illustrated in FIG. 11, a command of deleting "T," "O," "P," and "Z" in "HYUNDAI MOTOPZ" may be input.

As the same method, when the user inputs a flicking gesture by using two fingers, a command of deleting two characters may be input. When the user inputs the flicking gesture by using four fingers, a command of deleting four characters may be input. When the user inputs the flicking gesture by using five fingers, a command of deleting five characters may be input. According to the embodiment, when the flicking gesture is input to the touch unit 210 by three and more fingers, the entire characters may be deleted. For example, in a state in which "HYUNDAI MOTOPZ" is being input, when the flicking gesture is input to the touch unit 210 by three to five fingers, "MOTOPZ" may be deleted or "HYUNDAI MOTOPZ" may be deleted. When determining the unit of deleted character being input, whether a word spacing unit is included or not may be pre-determined or may be temporarily determined by the user.

Figure 13:
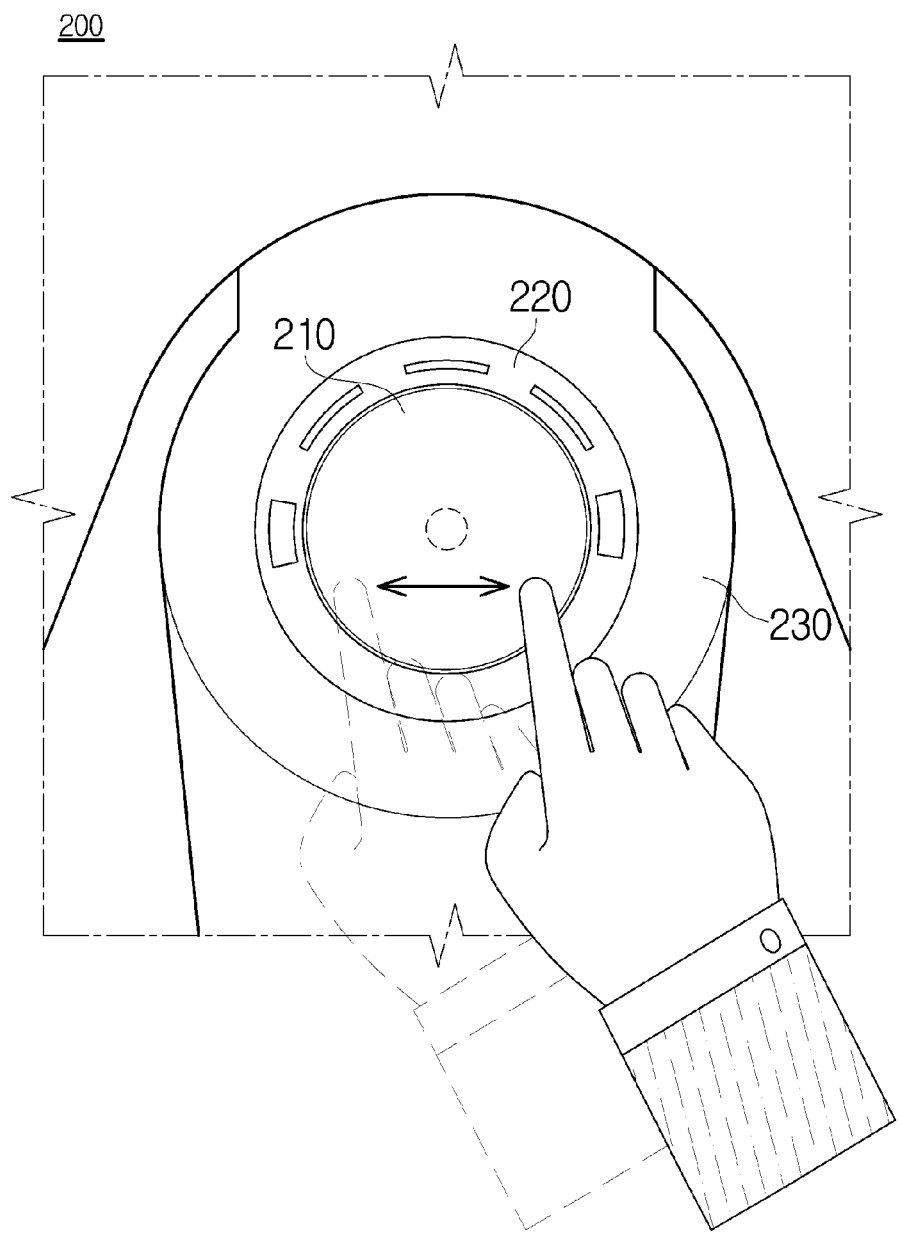
FIG. 13 is a view illustrating an example of swiping operation of touch input device.
Figure 14:
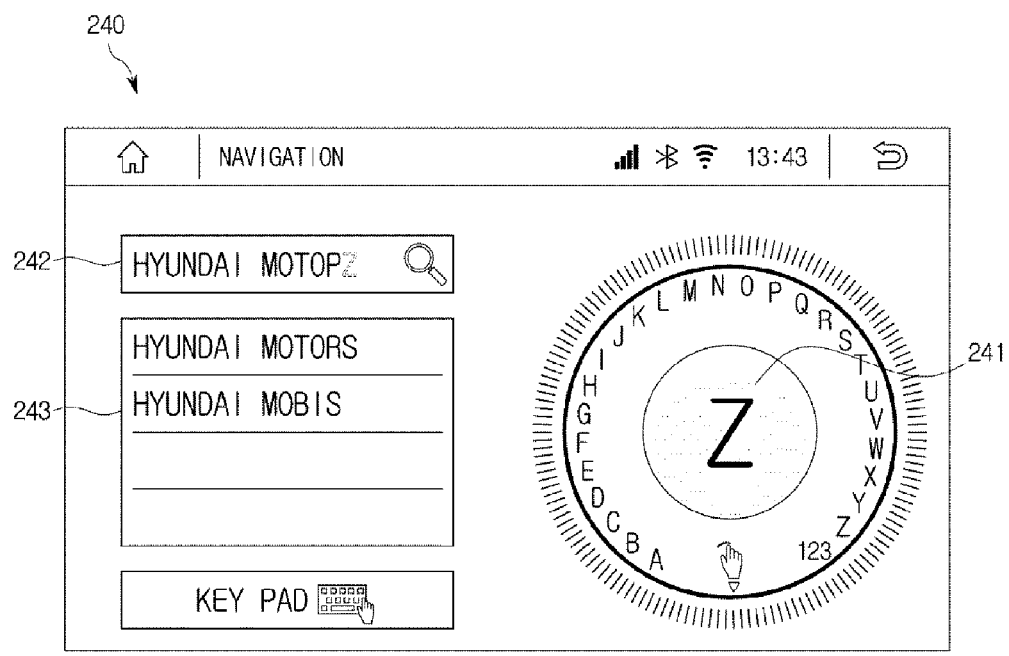
FIG. 14 is a view illustrating an operation screen displayed on a display according to the swiping gesture of FIG. 13.

FIG. 13 is a view illustrating an example of swiping operation of touch input device 200, and FIG. 14 is a view illustrating an operation screen displayed on a display according to the swiping gesture of FIG. 13.

Referring to FIGS. 13 and 14, a user may delete a character, which is being input, by inputting a swiping gesture to the touch unit 210 as erasing in a blackboard. The user may delete a character being input by inputting a gesture performed by swiping the touch unit 210 horizontally.

A user may adjust a method of deleting character by adjusting the number of simultaneous touch, input speed, input time, size, or the number of time of a swiping gesture input to the touch unit 210.

For example, in a state of inputting "HYUNDAI MOTOPZ", when the user inputs the swiping gesture by a single finger, as illustrated in FIG. 13, a command of deleting "Z" may be input, as illustrated in FIG. 14. According to the embodiment, when the swiping gesture is input by two fingers, the command of deleting "Z" and the command of deleting "P" may be simultaneously input.

When the swiping gesture is repeatedly input by the single finger, the command of deleting "Z" and the command of deleting "P" may be input in order. When the swiping gesture is input by the single finger at a faster speed than the previous speed, a character may be deleted in a direction of from "Z" to "P" with a certain acceleration.

When the swiping gesture is input continuously at least twice, the entire characters being input may be deleted. For example, when the user continuously inputs the swiping gesture with more than three seconds, "MOTOPZ" may be deleted or "HYUNDAI MOTOPZ" may be deleted. When determining the unit of deleted character being input, whether the word spacing unit is included or not may be pre-determined or may be temporarily determined by the user.

According to the embodiment, when the swiping gesture is input with a diameter, which is less than the previous diameter, a character among inputted characters may be deleted by a pre-determined unit. When the swiping gesture is input with a diameter, which is larger than the previous diameter, the entire inputted characters may be deleted. For example, when the user inputs the swiping gesture with a diameter, which is less than 3 cm, the command of deleting a unit of character, that is "Z" in "HYUNDAI MOTOPZ" may be input. When the user inputs the swiping gesture with a diameter, which is larger than 3 cm, "MOTOPZ" may be deleted or "HYUNDAI MOTOPZ" may be deleted. When determining the unit of deleted character being input, whether the word spacing unit is included or not may be pre-determined or may be temporarily determined by the user.

Hereinafter, a control method of the input device according to one embodiment will be described.

A control method of the input device 200 in accordance with one embodiment may include receiving an input of a command of touch via the touch unit 210, determining a unit of deleted character, which is being input, based on the number of simultaneous touch of touch gesture input to the touch unit 210. The touch gesture may include at least one gesture for deleting character, which is selected from the group including the above mentioned flicking, rolling, spinning, swiping, or tapping, but is not limited thereto.

The step of determining the unit of deleted character based on the number of simultaneous touch of touch gesture input to the touch unit 210 may include determining two characters to be deleted when a touch gesture including a single touch is input and determining two and more characters to be deleted or the entire characters to be deleted when a touch gesture including a plurality of pre-determined simultaneous touches are input.

According to the embodiment, the control method may include deleting a character at a first speed when a touch gesture input speed is less than a second speed. Further, the method includes deleting the character at a third speed, which is faster than the first speed, when the touch gesture input speed is faster than the second speed. According to the embodiment, when the touch gesture input speed is faster than the second speed, the character may be deleted with a certain acceleration.

The control method of the input device 200 may include deleting the character by a first unit when the touch gesture is input with a first time. The method further includes deleting a character by a second unit, which is larger than the first unit, when the touch gesture input time is longer than the first time. Here, the deleting by the second unit may include deleting the entire characters.

The control method may include deleting the character by a third unit, when a touch gesture a diameter is less than a first diameter. The method further includes deleting a character by a fourth unit, which is larger than the third unit, when the touch gesture diameter is large than the first diameter. The deleting by the fourth unit may include deleting the entire characters.

The control method may include deleting the character by a fifth unit when the number of touch gesture input is less than a first number of time. The method further includes deleting a character by a sixth unit, which is larger than the fifth unit, when the number of touch gesture input is more than the first number of time. The deleting by the sixth unit may include deleting the entire characters.

As for a detail description of the embodiment of the input device, a description of the same parts as those shown in the above-mentioned description will be omitted.

As is apparent from the above description, according to the proposed touch input device, the vehicle including the same and the control method of the input device, a user may more intuitively delete and correct an input character.

Although exemplary embodiments have been shown and described, it would be appreciated by those skilled in the art that changes may be made in these embodiments without departing from the principles and spirit of the disclosure, the scope of which is defined in the claims and their equivalents.

What is claimed is:

1. An input device comprising:
a display configured to display a character which is inputted by a user;
a touch unit having a concave shape and configured to receive a command for deleting the inputted character; and
a controller configured to determine a delete unit of the inputted character according to the number of touch gesture input to the touch unit by a user,
wherein the controller is configured to delete the inputted character at a first speed when a touch gesture input speed is less than a second speed, and configured to delete the inputted character at a third speed, which is faster than the first speed, when the touch gesture input speed is faster than the second speed.

2. The input device of claim 1 wherein the controller is configured to delete a single character when the touch gesture of a single touch is input and configured to delete two and more characters or entire characters when the touch gesture of a plurality of touches are input.

3. The input device of claim 1 wherein the touch gesture comprises at least one gesture selected from the group including flicking, rolling, spin, swiping, and tapping.

4. The input device of claim 1 wherein the controller is configured to delete the inputted character by a first unit when a touch gesture input time is less than a first time, and configured to delete the inputted character by a second unit, which is larger than the first unit, when the touch gesture input time is longer than the first time.

5. The input device of claim 1 wherein the controller is configured to delete the inputted character by a third unit when a touch gesture input diameter is less than a first diameter, and configured to delete the inputted character by a fourth unit, which is larger than the third unit, when the touch gesture input diameter is larger than the first diameter.

6. The input device of claim 1 wherein the controller is configured to delete the inputted character by a fifth unit when the number of touch gesture input is less than a first number of time, and configured to delete the inputted character by a sixth, which is larger than the fifth unit, when the number of touch gesture input is more than the first number of time.

7. The input device of claim 1 wherein the display and the touch unit are formed separately.

8. A vehicle comprising:
a display configured to display a character which is inputted by a user;
a touch unit having a concave shape and configured to receive a command for deleting the inputted character; and
a controller configured to control a delete unit of the inputted character, which is deleted according to the number of touch gesture input to the touch unit by the user,
wherein the controller is configured to delete the inputted character at a first speed when a touch gesture input speed is less than a second speed, and configured to delete the inputted character at a third speed, which is faster than the first speed, when the touch gesture input speed is faster than the second speed.

9. The vehicle of claim 8 wherein the controller is configured to delete a single character when the touch gesture of a single touch is input, and configured to delete two and more characters or entire characters when the touch gesture of a plurality of touches are input.

10. The vehicle of claim 8 wherein the touch gesture comprises at least one gesture selected from the group including flicking, rolling, spinning, swiping, and tapping.

11. The vehicle of claim 8 wherein the controller is configured to delete the inputted character by a first unit when a touch gesture input time is less than a first time, and configured to delete the inputted character by a second unit, which is larger than the first unit, when the touch gesture input time is longer than the first time.

12. The vehicle of claim 8 wherein the controller is configured to control the inputted character by a third unit when a touch gesture input diameter is less than a first diameter, and configured to delete the inputted character by a fourth unit, which is larger than the third unit, when the touch gesture input diameter is larger than the first diameter.

13. The vehicle of claim 8 wherein the controller is configured to delete the inputted character by a fifth unit when the number of touch gesture input is less than a first number of time, and configured to delete the inputted character by a sixth unit, which is larger than the fifth unit, when the number of touch gesture input is more than the first number of time.

14. The vehicle of claim 8 wherein the display and the touch unit are formed separately.

15. A control method of an input device including a touch unit which has a concave shape, the control method comprising:
- receiving, by the touch unit, a touch command;
- determining, by a controller a delete unit of a character, which is inputted, according to the number of touch gesture input, which is input to the touch unit by a user,
- deleting the inputted character at a first speed when a touch gesture input speed is less than a second speed; and
- deleting the inputted character at a third speed, which is faster than the first speed, when the touch gesture input speed is faster than the second speed.

16. The control method of claim 15 wherein the step of determining comprises:
- determining a single character to be deleted when the touch gesture input of a single touch is input; and
- determining two and more characters or entire characters to be deleted when the touch gesture input of a plurality of touches are input.

17. The control method of claim 15 wherein the touch gesture comprises at least one gesture selected from the group including flicking, rolling, spinning, swiping, and tapping.

18. The control method of claim 15 further comprising:
- deleting the inputted character by a first unit when a touch gesture input time is less than a first time; and
- deleting the inputted character by a second unit, which is larger than the first unit, when the touch gesture input time is longer than the first time.

19. The control method of claim 15 further comprising:
- deleting the inputted character by a third unit when a touch gesture input diameter is less than a first diameter; and
- deleting the inputted character by a fourth unit, which is larger than the third unit, when the touch gesture input size is larger than the first diameter.

20. The control method of claim 15 further comprising:
- deleting the inputted character by a fifth unit when the number of touch gesture input is less than a first number of time; and
- deleting the inputted character by a sixth unit, which is larger than the fifth unit, when the number of touch gesture input is more than the first number of time.

* * * * *